H. HERTZBERG.
ELECTROTHERMAL DEVICE.
APPLICATION FILED APR. 26, 1918.
1,292,773.
Patented Jan. 28, 1919.
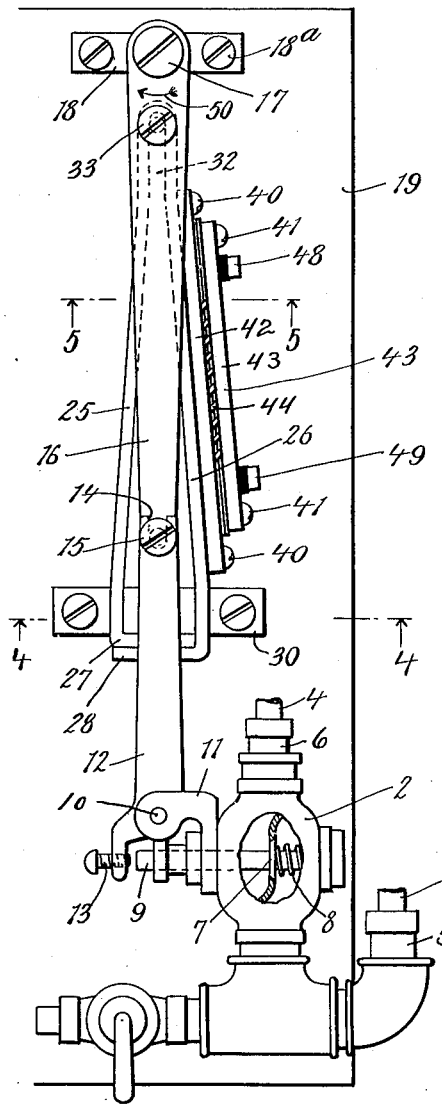
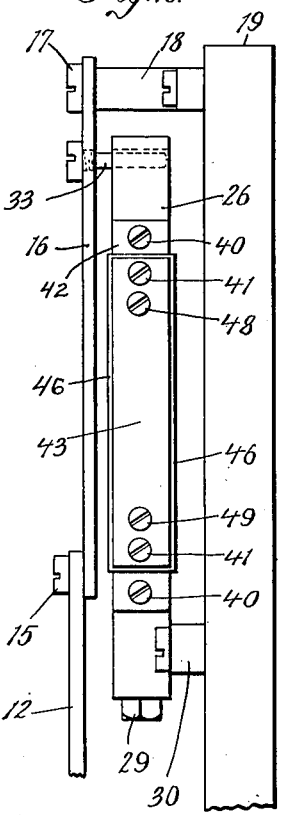
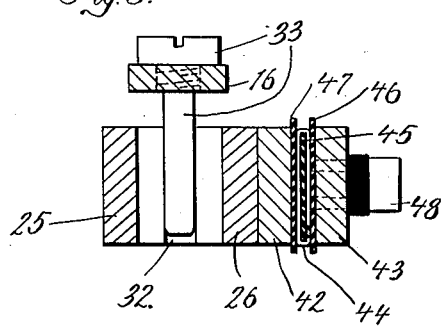
INVENTOR
Harry Hertzberg
BY
Lewis J. Doolittle
ATTORNEY

UNITED STATES PATENT OFFICE.

HARRY HERTZBERG, OF NEW YORK, N. Y., ASSIGNOR TO PYRENE MANUFACTURING COMPANY, A CORPORATION OF DELAWARE.

ELECTROTHERMAL DEVICE.

1,292,773.  Specification of Letters Patent.  Patented Jan. 28, 1919.

Application filed April 26, 1918. Serial No. 231,053.

*To all whom it may concern:*

Be it known that I, HARRY HERTZBERG, citizen of the United States, and resident of the city, county, and State of New York, have invented certain new and useful Improvements in Electrothermal Devices, of which the following is a specification.

This invention relates to an electro-thermal device intended more particularly for use in effecting a delayed mechanical movement of certain parts or mechanisms to which the device may be applied.

The invention has for a general object to provide a device of exceedingly simple construction whereby mechanical movement of certain parts or mechanisms may be effected by electrically operated means with an appreciable delay between the application of the electric current and the resulting mechanical movement.

One use of the device is in connection with a fire extinguishing system to control the flow of a fire extinguishing liquid to an electrically heated vaporizer, to which current is automatically supplied by a thermostat, to prevent discharge of the liquid upon the vaporizer before the latter has been properly heated.

For further comprehension of the invention, and of the objects and advantages thereof, reference will be had to the following description and accompanying drawings describing and illustrating one embodiment of the invention.

Figure 1 of the drawings is a front view of the device applied to operate a valve.

Fig. 2 is a side elevation thereof, the valve being omitted.

Fig. 3 is a detail face view, partly broken away, of the heating element.

Fig. 4 is a horizontal section on the line 4—4 of Fig. 1.

Fig. 5 is an enlarged horizontal section on the line 5—5 of Fig. 1.

While I have here shown my invention as applied to the operation of a valve, it will be understood, of course, that it may be employed in the operation of other parts or mechanisms, as desired, and that it is shown applied to a valve as illustrative only of one use to which it may be put.

The valve 2, to which I have here shown my invention applied, is of the globe type and is shown as controlling the flow of liquid between the pipes 3 and 4, short portions of which are shown leading into the valve couplings 5 and 6.

The valve member 7 may be normally held closed upon its seat by a coiled spring 8 and provided with a projecting stem 9, by depression of which the valve is opened.

A lever 12 is fulcrumed between its ends, as at 10, to a bracket 11 fixed to the valve casing, one end of which projects over the stem 9. A screw 13 may be threaded through this end of the lever 12 in alinement with the stem 9 to permit of adjustment of the operative relation of the lever and stem.

The opposite end of the lever 12 is forked or slotted, as at 14, to straddle a stud 15, which is screwed into the free end of a second lever 16 which is fulcrumed at its other end, at 17, upon a block 18 which is attached by screws 18ª upon a suitable base 19, upon which the valve 2 may also be mounted in any suitable manner.

Mounted upon the base 19 and interposed between the latter and the extended levers 12 and 16, is an electro-thermal device whereby the lever 16 is operated. This device as here shown comprises a single bar bent upon itself to form legs 25 and 26 having inturned overlapping feet 27 and 28 which are secured by a bolt 29 to a block 30 fixed upon the base 19.

The legs 25 and 26 incline upwardly and inwardly toward one another for the major portion of their length, presenting, near their crotch, a narrow slot 32 into which projects a pin 33 carried by the lever 16.

This bar is, in effect, arranged to constitute a narrow-based isosceles triangle having a common median plane with the levers 12 and 16, when in normal or inoperative position.

Fixed upon one of the legs 26 of the bar by suitable means, as the screws 40 and 41, are a pair of shorter bars 42 and 43, which are superposed upon one another with an electric heating element between them. This heating element as here shown, comprises a suitable metal filament 44 wound on a strip 45 of insulating material, such as mica, covered by strips 46 and 47, also of mica, the opposite ends of the filament 44 being connected to suitable binding posts 48 and 49.

In the operation of the device the application of electric current to the filament 44 causes a heating of the leg 26, upon which the heater is mounted, with a consequent longitudinal expansion of this leg, as will be obvious. The other leg, 25, being unaffected by the heat, will remain unchanged and, since the two legs 25 and 26 are rigidly bound together at their lower ends, the expansion of this leg will resolve itself into and cause a lateral movement of the upper end in the direction shown by the arrow 50, to accommodate the increased length of leg 26.

It is not considered necessary to indicate on the drawings how the lengthening of one side of a triangle without any change in the base or the other side will result in the apex of the triangle being moved to one side, since such is a well known geometrical fact. Furthermore, with the narrow-based triangle here shown, the lateral movement will be multiplied many times over the expansion movement, as will be obvious.

Since the apex of the triangle, here constituted by the crotch or upper portions of the legs, engages the pin 33 carried by the lever 16 the latter is swung on its fulcrum 17, and, in turn, imparts movement to the lever 12, which depresses the stem 9 and opens the valve 2, as will be obvious from Fig. 1 of the drawings.

The arrangement of levers forming the connection between the electro-thermal device and the valve, as herein shown and described, has been designed for one particular application or illustration of the invention and is to be understood that the arrangement may be changed to accommodate the requirements of the particular use of the device.

By adjusting the screw 13 the time elapsing between the application of the electric current and the opening of the valve may be varied as desired. This may also be effected by adjusting the resistance or the heating current, or both, as may be found best adapted for the use to which the device is put.

My invention obviates the necessity for any complicated arrangement of mechanical motor devices for effecting the delayed action of a part and also dispenses with any need of resetting after each operation, as it will be obvious that as soon as the heating current is cut off the parts automatically assume their normal position, as shown, and the valve or other mechanism operated thereby closes.

What I claim is:—

1. In a device of the class specified, the combination with a bar adapted to be moved laterally of itself by the application of heat thereto, of an electric heating device applied to such bar and comprising a heating coil wound upon a flat strip, and means for clamping said strip upon said bar.

2. In a device of the class specified, the combination with a bar adapted to be moved laterally of itself by the application of heat thereto, of a pair of bars clamped upon said bar, and an electric heating coil located between said pair of bars.

3. In a device of the class described, in combination, a pair of bar members rigidly secured to one another at each end thereof and inclined toward one another, and a heating device applied to one of said bar members.

4. In a device of the class described, in combination, a pair of bar members rigidly secured to one another at each end thereof, and an electro-thermal heating device applied to one of said bar members, said heating device including a coil insulated from said bar member.

5. A device of the class described comprising a triangular structure rigidly supported at its base and adapted to have its apex connected to a part to be moved, and means for applying heat to one side of said triangular structure.

6. A device of the class described comprising a narrow-based triangle with its base rigidly connected to a fixed support and adapted to have its apex connected to a part to be moved, and means for heating one side of said triangle.

7. In a device of the class described, a bar adapted to be expanded by heat, means whereby the longitudinal expansive movement of said bar is translated into lateral motion thereof, said bar being adapted to be connected to a part to be moved, an electro-thermal heating means applied to and carried by said bar.

Signed at city, county and State of New York, this 25th day of March, 1918.

HARRY HERTZBERG.